United States Patent [19]
Park

[11] Patent Number: 5,941,545
[45] Date of Patent: Aug. 24, 1999

[54] TOE ADJUSTMENT ASSEMBLY FOR AUTOMOTIVE VEHICLES

[75] Inventor: Joon-Hong Park, Ansan, Rep. of Korea

[73] Assignee: Hyundai Motor Company, Seoul, Rep. of Korea

[21] Appl. No.: 08/993,646

[22] Filed: Dec. 18, 1997

[30] Foreign Application Priority Data

Dec. 19, 1996 [KR] Rep. of Korea .................. 96 67762

[51] Int. Cl.⁶ .................................................. B62D 17/00
[52] U.S. Cl. .................................... 280/86.758; 280/86.75
[58] Field of Search ........................... 285/86.75, 86.758, 285/86.751, 86.753, 86.754, 86.755, 86.752, 86.737

[56] References Cited

U.S. PATENT DOCUMENTS

| | | | |
|---|---|---|---|
| 3,887,211 | 6/1975 | Mazar | 280/86.758 |
| 4,371,191 | 2/1983 | Goldberg et al. | 280/5.501 |
| 4,736,964 | 4/1988 | Specktor | 280/86.75 |
| 4,838,573 | 6/1989 | Specktor et al. | 280/86.75 |
| 5,027,275 | 6/1991 | Sakamoto et al. | 701/36 |

*Primary Examiner*—Christopher P. Ellis
*Attorney, Agent, or Firm*—Christie, Parker & Hale, LLP

[57] ABSTRACT

A toe adjustment assembly for simply adjusting toe-in and toe-out values of an automotive vehicle is provided in the present invention, the assembly comprising: a long hole formed oppositely from a cross member; a bolt inserted in a cross member and connected at a predetermined gap for mobility to get both arms at both sides rotated; a limiting unit formed at the cross member to limit the position of the bolt at one or both sides; and an adjusting unit connected to cooperatively drive the bolt.

9 Claims, 3 Drawing Sheets

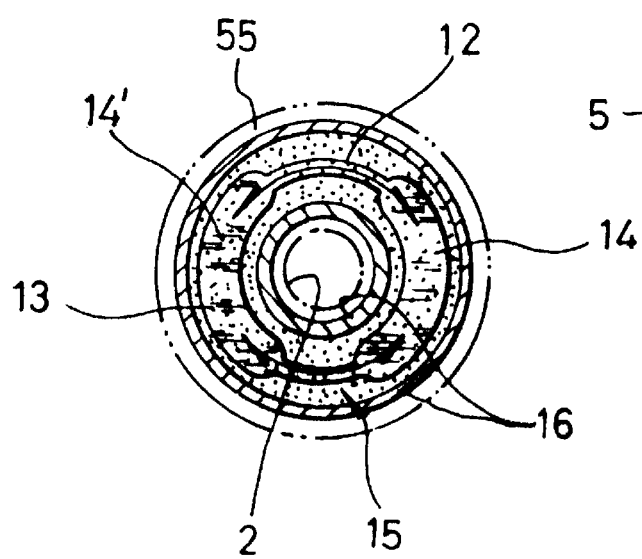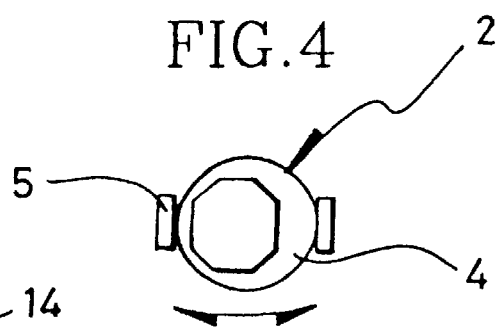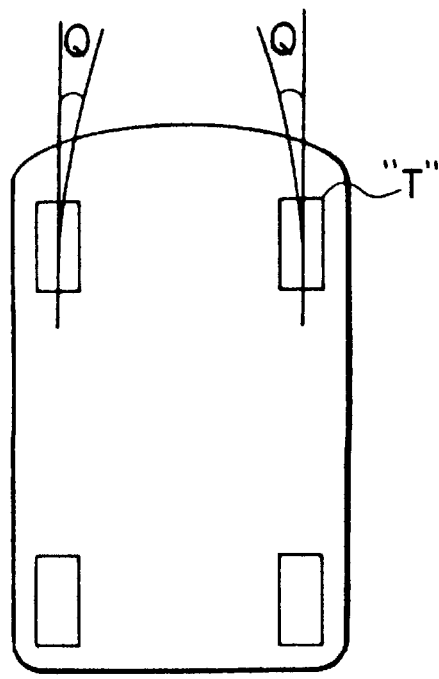

TOE ADJUSTMENT ASSEMBLY FOR AUTOMOTIVE VEHICLES

BACKGROUND OF THE INVENTION

1. Field of the Invention

The present invention relates to an adjustment assembly, and more particularly to a toe adjustment assembly for adjusting toe-in and toe-out values of an automotive vehicle.

2. Description of the Prior Art

In general, a vehicle is a device being driven at a high speed as well as at a desired direction by steering front wheels. A wheel alignment of the front wheels is closely related to safety and steering performances, specifically to straight driving.

The wheel alignment has a function of properly adjusting camber, toe-in, inclination of king-pin, caster, etc., to meet the performances of a vehicle. The camber and the toe-in provide an essential influence on driving quality of a vehicle. The camber prevents a lower part of a tire from being widened by weight of a vehicle and reduces the adjusting capacity of a steering wheel. On the other hand, the toe-in stops a front side of a tire from being twisted to thereby improve the straight drive. The toe-in inwardly inclines the front side of the tire at a certain angle θ as illustrated in a plane of a vehicle in FIG. 5, and plays a role to refrain the front side of the tire (T) from being twisted by the camber while driving, thus improving straight driving stability.

The toe-in is controlled, as shown in FIG. 6, by the length of an arm(55) on the vehicle suspension system which comprises a knuckle(51) linked into a hub(50), a straight assembly(52) perpendicularly connected into the knuckle (51), and the arm(55) aligned between the knuckle for a slanted rotation at one end and bolts(54) of the cross member(53) for rotation at the other end.

In order to control the length of the arm(55), the arm(55) is divided into two, a first arm(55') with a left screw (56) and a second arm(55") with a right screw respectively, and a controlling member (58) is mounted for round traveling of two screws(56 and 57). When the controlling member(58) connected to the screws(56, 57) rotates clockwise or counterclockwise, the arms(55' and 55") and the knuckle (51) are subsequently pulled or expanded to adjust a toe-in. Of course, when adjusting the toe-in, the arm(55) should be separately adjusted since arms are installed at both sides of the suspension system.

SUMMARY OF THE INVENTION

A toe adjustment assembly for adjusting tires attached to an automotive vehicle is provided in the present invention, the assembly comprising:

a cross member;

a first arm for adjusting a first said tire;

a first bolt in the cross member, the first arm being rotatable about the first bolt;

a second arm for adjusting a second said tire;

a second bolt in the cross member, the second arm being rotatable about the second bolt;

the first and second bolts being movable relative to the cross member;

limiting means on the cross member to limit the movement of the first bolt relative to the cross member; and adjusting means connected for adjusting the relative position of the first bolt and the second bolt for moving the first and second arms towards and apart from each other and thereby adjusting the toe adjustment of such first and second tires.

However, there is a problem in that unnecessary labor loss and imprecise adjustment of toe-in may result from separate adjustment by two individual workers in a group at each side of the suspension system. Therefore, it is an object of the present invention to solve the aforementioned problems by providing a toe adjustment assembly for simplifying an adjustment operation of toe-in and toe-out.

In accordance with the object of the present invention, there is provided a toe adjustment assembly for automotive vehicles, the assembly comprising:

a long hole oppositely formed from a cross member;

a bolt inserted in the cross member and connected at a predetermined gap for mobility to get both arms at both sides rotated;

limiting means formed at the cross member to limit the position of the bolt at one or both sides; and adjusting means connected to cooperatively drive the bolt.

BRIEF DESCRIPTION OF THE DRAWINGS

For fuller understanding of the nature and objects of the invention, reference should be made to the following detailed description taken in conjunction with the accompanying drawings in which:

FIG. 3 is a detailed sectional view of reinforcement means illustrated in FIG. 2;

FIG. 4 is a plane illustrating a rotation of a cam bolt shown in FIG. 2;

FIG. 5 is a schematic diagram illustrating toe state of a tire in a conventional automotive vehicle.

DETAILED DESCRIPTION OF THE INVENTION

Figure 1:
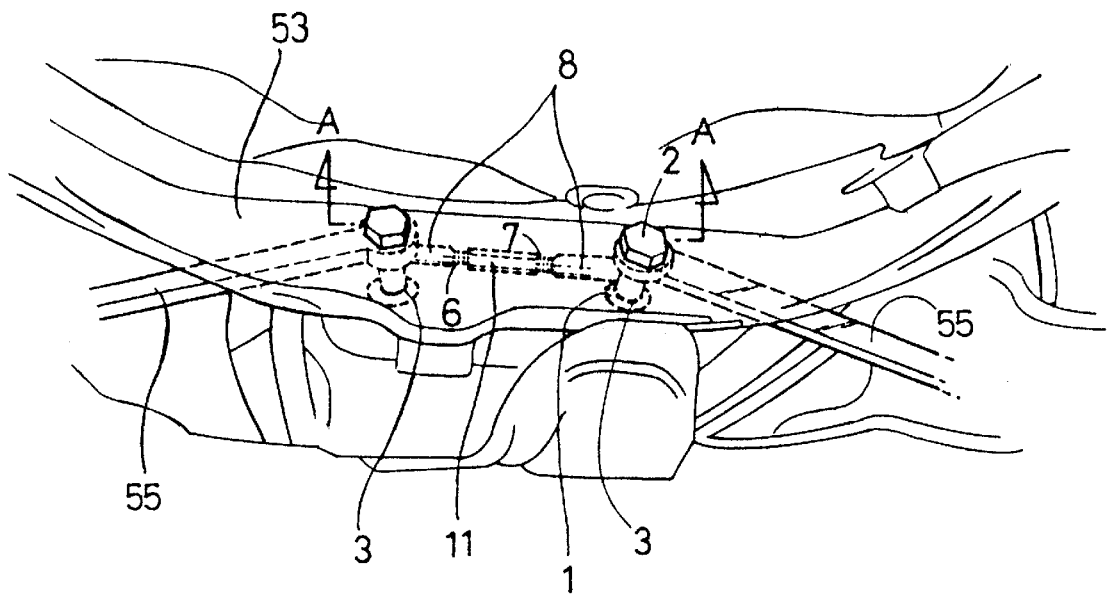
FIG. 1 is a perspective view of a toe adjustment assembly of an automotive vehicle in accordance with the present invention.
Figure 2:
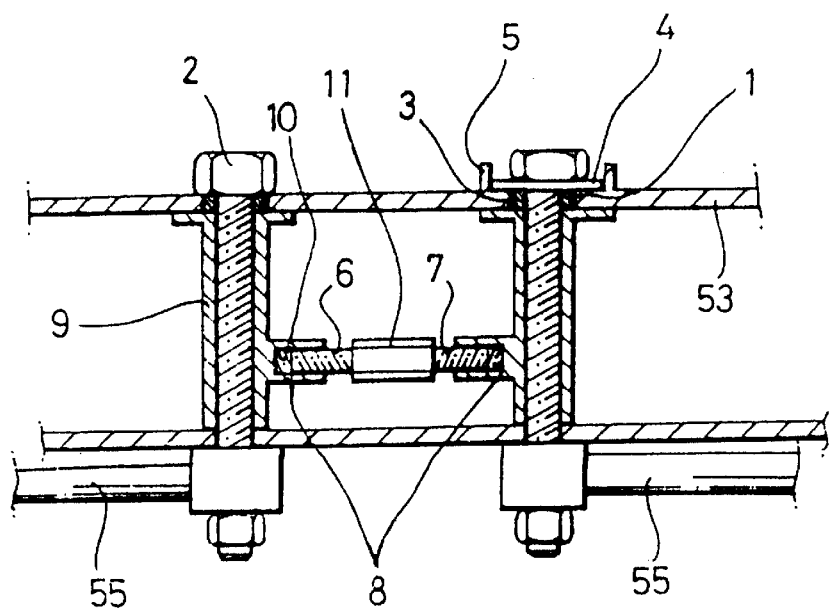
FIG. 2 is a sectional view taken along line A—A shown in FIG. 1.
Figure 6:
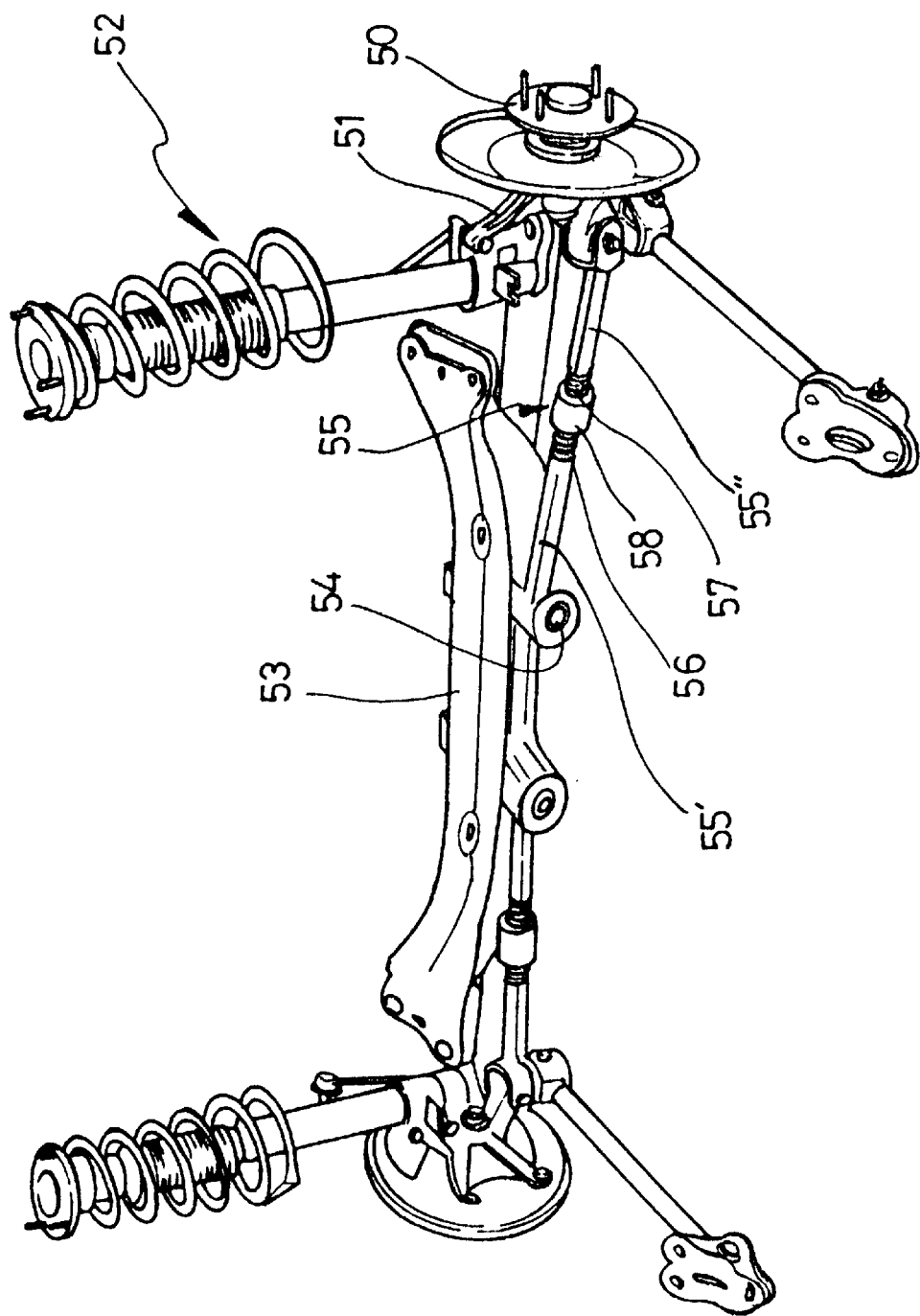
FIG. 6 is a perspective view of a suspension in a conventional automotive vehicle.

As shown in a perspective view of the toe adjustment assembly in FIG. 1 and a sectional view taken along line A—A in FIG. 2, there is provided a toe adjustment assembly in an automotive vehicle in accordance with the present invention, the assembly comprising: a long hole(1) oppositely formed from a cross member(53); a bolt(2) inserted therein and connected at a predetermined gap for mobility to get arms(55) at both sides rotated; limiting means formed at the cross member to limit the position of one or both sides thereof; and adjusting means connected to drive the bolt. It is known that a rubber bush is disposed at a gap between the bolt(2) and the long hole(1) to minimize vibration of the bolt(2).

The limiting means is made up of a cam(4) at one side of the bolt(2) and a fixed protuberance(5) installed at the cross member (53) to closely attach an periphery cam(4). Therefore, as the bolt(2) is rotated by the cam(4) restrained at the fixed protuberance(5), the bolt(2) changes positions thereof and is then fixed to prevent a movement of the entire arms(55).

The adjusting means comprises a fitting member(9) connected to the hollow bolts(2) of both sides for rotation and having extended part(8) for left and right screws(6 and 7) at inner sides thereof, and a rotating member(11) to allow the fitting member(9) to move oppositely in screw threads(10)

formed at both sides of the extended part(8) when the rotating member is in rotation. Particularly, reinforcement means is installed between the bolt(2) and the arm(55) connected to the cross member(53) to maintain a lateral force after toe-in is adjusted.

The reinforcement means shown in FIG. 3 has a bush(15) oppositely formed toward the adjusting direction of toe and linked to an oil transporting hole(12) having chambers(14 and 14') to be full of fluid(13), such as oil, and sleeves(16) attached to inner and outer peripheries of the bush(15) and connected to the bolt(2) and the arm(55). Thus, horizontal movement of the bolt(2) compresses the fluid in a chamber (14) to flow into the other expanded chamber(14') at an opposite side, wherein the fluid pressure supports the bolts (2).

Now an operational effect of the present invention will be described. When a vehicle is lifted by a lifter, the rotating member(11) is rotated in order to adjust toe. For instance, when the car is currently under toe-out state, the rotating member(11) is rotated clockwise as shown in a sectional view seen from the right side. When the rotating member (11) is circulated clockwise, the fitting member(9) is pulled toward the rotating member(11). As the extended parts of the rotating member(11) and fitting member(9) are differently connected by left and right screws(6 and 7), the fitting member(9) is moved into the opposite side when the rotating member(11) is rotating. When the fitting member(9) is pulled, the bolt compresses a sleeve(16) contacted thereto being supported by the bush(3) and compresses the bush(15) toward a moving direction.

The bolt(2) is securely supported by the fluid filled in chambers(14 and 14') as the fluid flows toward the chambers (14 and 14') through the oil transporting hole(12). Therefore, the bolt(2) is firmly supported at all directions by the fluid(13). When the bolt(2) is moved at a certain distance by the pulling of the rotating member(11), the arm(55) cooperatively coupled thereto is driven and then the knuckle(51) connected to the arm is pulled to adjust the toe.

On the other hand, when the rotating member(11) is rotated counterclockwise, the fitting member(9) is pushed on be opened to the opposite side to adjust toe-out. Therefore, the adjustment of toe is carried out very easily as toe at both sides is adjusted only by rotating the rotating member(11).

As the fluid fulfilled in the chamber(14 and 14') of the bush(15) supports periphery of the bolt(2), its resistance to lateral force is substantially improved, that is, greater than that of a conventional rubber bush, to thereby keep toe value constant even when the arm(55) is twisted by bumps on the surface of a road in driving.

When toe value at one side is differently adjusted from that of the other side, toe values at both sides should be equalized by the cam(4) and the fixed protuberance(5) formed at the bolt, so called a zero-point setting. As the cam(4) located at a different distance from the center axis shown in FIG. 4 is rotated, the center position can be changed between fixed members, that is, the center axis is changed. When the center axis of the bolt(2) is moved, the bolt(2) and the fitting member(9) are entirely moved to equalize the toe value at both sides.

As described above, there is an advantage in the present invention in that toe adjustment is conveniently carried out as first and second arms at both sides are simultaneously controlled by the rotating member and the fitting member.

What is claimed is:

1. A toe adjustment assembly for adjusting tires attached to an automotive vehicle, the assembly comprising:

a cross member;

a first arm for adjusting a first said tire;

a first bolt in the cross member, the first arm being rotatable about the first bolt;

a second arm for adjusting a second said tire;

a second bolt in the cross member, the second arm being rotatable about the second bolt;

the first and second bolts being movable relative to the cross member;

limiting means on the cross member to limit the movement of the first bolt relative to the cross member; and adjusting means connected for adjusting the relative position of the first bolt and the second bolt for moving the first and second arms towards and apart from each other and thereby adjusting the toe adjustment of such first and second tires.

2. The assembly as claimed in claim 1 wherein the first bolt has a top end and a bottom end, the bottom end of the first bolt rotatably connected to the first arm and the second bolt has a top end and a bottom end, the bottom end of the second bolt rotatably connected to the second arm and the bottom end of the second bolt being adjacent to the bottom end of the first bolt, whereby the top end of the first bolt moved laterally causes the bottom end of the first bolt and thus the first arm to move in the opposite lateral direction and the top end of the second bolt moved laterally causes the bottom end of the second bolt and thus the second arm to move in the opposite lateral direction.

3. The assembly as claimed in claim 1 wherein the assembly further comprises an elastic bush supporting the first bolt in the cross member and another elastic bush supporting the second bolt in the cross member.

4. The assembly as claimed in claim 1 wherein the limiting means further comprises a cam at one end of the first bolt and a fixed protuberance adjacent to the periphery of the cam and attached to the cross member.

5. The assembly as claimed in claim 1 wherein the adjusting means comprises:

a left screw;

a right screw;

a first fitting member connected to the first bolt, the first fitting member having an extended part for receiving the left screw;

a second fitting member connected to the second bolt, the second fitting member having an extended part for receiving the right screw;

a rotating member connected for rotating the left screw and and thereby rotating the rotating member, rotates the left screw and causes the first fitting member to move the first bolt and likewise the first arm and rotates the right screw and causes the second fitting member to move the second bolt and likewise the second arm.

6. The assembly as claimed in claim 1 wherein the assembly further comprises a reinforcement means between the first bolt and the first arm for resisting lateral movement of the first such tire after adjusting the toe of the first such tire and another reinforcement means between the second bolt and the second arm for resisting lateral movement of the second such tire after adjusting the toe of the second such tire.

7. The assembly as claimed in claim 6 wherein the reinforcement means comprises:

a bush having two oppositely formed left and right chambers and concavely facing towards the tires, the left and right chambers containing fluid and the bush further having a top fluid transporting conduit linking the top of the left chamber to the top of the right chamber and a bottom fluid transporting conduit linking the bottom of the left chamber to the bottom of the right chamber;

an inner sleeve attached to the inner periphery of the bush and connected to the outer periphery of the first or second bolt; and an outer sleeve attached to the outer periphery of the bush and connected to the inner periphery of the first or second arm.

8. The assembly as claimed in claim 7 wherein the fluid in the left and right chambers is oil.

9. A toe adjustment assembly for adjusting at least one tire attached to an automotive vehicle, the assembly comprising:

a cross member;

at least one arm for adjusting the at least one tire;

at least one bolt in the cross member, the at least one arm being rotatable about the at least one bolt;

the at least one bolt being transversely movable relative to the cross member;

a limiting means on the cross member to limit the movement of the at least one bolt relative to the cross member; and adjusting means connected for adjusting the relative position of the at least one bolt to move the at least one arm towards or away from the at least one tire and thereby adjusting the toe adjustment of the at least one tire.

* * * * *